United States Patent Office 3,483,172
Patented Dec. 9, 1969

3,483,172
CROSS-LINKABLE ACRYLONITRILE COPOLYMERS AND PRODUCTION THEREOF
Takashi Shibukawa and Masahiko Ozaki, Saidaiji, Japan, assignors to Japan Exlan Company Limited, Osaka, Japan
No Drawing. Filed July 7, 1966, Ser. No. 563,351
Claims priority, application Japan, July 14, 1965, 40/42,496, 40/42,497
Int. Cl. C08f 15/22, 15/40
U.S. Cl. 260—80.73                    2 Claims

ABSTRACT OF THE DISCLOSURE

The present invention provides for a method of producing a cross-linkable acrylonitrile copolymer by copolymerizing acrylonitrile with N-methylolacrylamide, with or without one or more monoethylenically unsaturated compounds, in an aqueous medium and in the presence of a redox catalyst system containing a reducing sulfoxy compound as one of its components, said method characterized by conducting the copolymerization reaction at a pH of 4 or lower and in the presence of a water soluble inorganic salt in an amount of one third or more moles of the salt per mole of the N-methylolacrylamide.

---

The present invention relates to a novel method for the production of a copolymer of acrylonitrile and N-methylolacrylamide with or without further comonomer(s) selected from monoethylenically unsaturated compounds copolymerizable with acrylonitrile, and also to a method for stabilizing such a copolymer.

N-methylolacrylamide is a compound containing both the polymerizable vinyl group and the condensible methylol group. Thus, by taking advantage of this vinyl group, it is possible to copolymerize said compound with other vinyl monomer(s) to produce a copolymer or multi-copolymer. It is, then, possible to spin a fiber from said copolymer or multicopolymer and cause the condensible methylol group in the resulting fiber to cross-link so as to give the fiber a permanent crimp, resistance to creasing, and excellent resiliency, or give it many other valuable properties.

While N-methylolacrylamide is thus apparently a useful monomer, one important thing is that the above-mentioned cross-linking reaction should not take place in the course of the polymerization reaction and therefore the resulting copolymer is not yet cross-linked at the end of the polymerization reaction. Moreover, the other important thing is that the desired cross-linking reaction can be induced subsequently by heating the fiber spun from said copolymer or treating the same with an aqueous acid solution. However, it was stated in the Journal of Industrial Chemistry of Japan (vol. 63, pp. 1631–5, 1960) that at pH 4 or lower, N-methylolacrylamide readily cross-links in the course of polymerization reaction. It is for this reason that when acrylonitrile is copolymerized with N-methylolacrylamide, the reaction system must be controlled at pH 7 by means of a phosphoric acid buffer in order to inhibit the cross-linking reaction and the resultant gelling due to the condensation of the methylol group of the N-methylolacrylamide (the Journal of Industrial Chemistry of Japan, vol. 62, pp. 1117–9, 1959).

On the other hand, when a redox catalyst system containing a reducing sulfoxy compound as one of its components is used in the copolymerization reaction, it is always necessary to control the reaction system at pH 4 or lower. Thus, when acrylonitrile is copolymerized with N-methylolacrylamide in the presence of such a catalyst, a cross-linking reaction will take place in the course of the copolymerization reaction so that the resulting copolymer will be insoluble or very sparingly soluble in solvents to be used for spinning.

We have found a certain set of conditions under which the desired copolymerization reaction can be conducted at pH 4 or lower and in the presence of a redox catalyst system containing a water-soluble reducing sulfoxy compound in an aqueous medium without inducing cross-linking reaction so as to yield a copolymer that remains yet to be cross-linked subsequently.

Thus, the present invention is concerned with a process of producing acrylic copolymers which comprises copolymerizing acrylonitrile with N-methylolacrylamide or causing said two monomers to copolymerize further with one or more monoethylenically unsaturated compounds copolymerizable therewith in an aqueous medium and in the presence of a redox catalyst system containing a water-soluble reducing sulfoxy compound as one of its components, characterized by permitting one or more water-soluble inorganic salts to be present in the copolymerization reaction system in an amount of not less than $\frac{1}{3}$ mole per each mole of the N-methylolacrylamide in the polymerization medium whereby substantially no cross-linking is allowed to take place in the course of said copolymerization reaction even at pH 4 or lower.

In the above process, it is not sufficiently clear why the cross-linking reaction is prevented from taking place in the course of copolymerization even at such low pH and a copolymer that is yet to be cross-linkable is obtained. it is, however, due presumably to the following mechanism.

Thus, the possible sources of said cross-linking seem to include, as illustrated below, the condensation reaction between individual methylol groups on heating under acidic conditions, the radical-type cross-linking between the methylol group and another group in the presence of a radical catalyst, or the ester-exchange involving the methylol group in cases where methyl acrylate or ethyl acrylate, for instance, is present in the reaction system.

(1) Cross-linking on heating under acidic conditions:

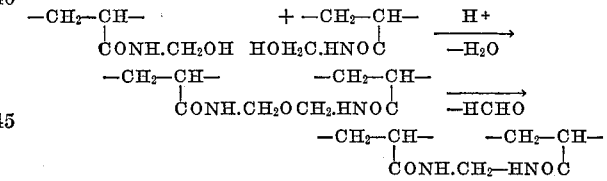

(2) Radical-type cross-linking, and

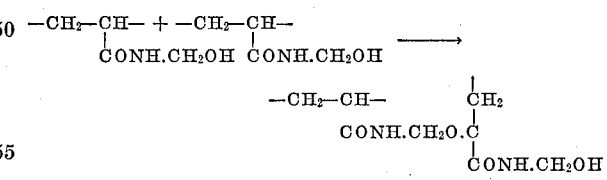

(3) Ester-exchange

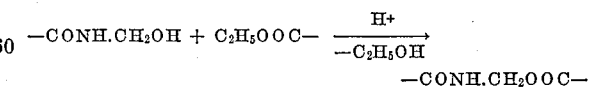

Out of the above three reactions, the third reaction is apparently a minor and negligible factor.

These cross-linking reactions seem to take place as the methylol group in the copolymer is dissociated in an aqueous medium, especially within the rang of pH 2–5, as shown by the following expression, and the methylolacrylamide is ionized.

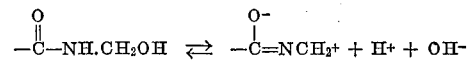

Accordingly, the polymerization reaction alone proceeds without inducing said cross-linking when the polymerization is conducted at pH 4 or lower and in the presence of ⅓ or more mole of said water-soluble inorganic salt per mole of N-methylolacrylamide. This phenomenon may be explained by the assumption that as the N-methylolacrylamide is ionized, the salt ion in the polymerization medium surrounds the N-methylolacrylamide ion so that the activity of the N-methylolacrylamide ion and accordingly its reactivity are reduced.

The reducing sulfoxy compound that is employed according to this invention may be selected from the class consisting of e.g. sulfites, bisulfites, metasulfites, hydrosulfites, and thiosulfates which are well known in the art. The redox catalyst system containing one of said reducing agents as one of its components may contain, as a counterpart component, a member selected from the class consisting of e.g. ammonium persulfate, potassium persulfate, sodium chlorate, potassium chlorate, hydrogen peroxide, and the like.

To ensure that more than ⅓ mole of the water-soluble inorganic salt (for each mole of N-methylolacrylamide) be present in the polymerization medium, there may be added such water-soluble metal chlorides as sodium chloride, potassium chloride, lithium chloride, calcium chloride, etc., such water-soluble sulfates as sodium sulfate, potassium sulfate, etc., or such water-soluble nitrates as sodium nitrate, potassium nitrate, etc., or a reducing component in excess of the amount to be consumed in the reduction-oxidation of a redox catalyst system containing the reducing sulfoxy compound.

However, the resulting copolymer of acrylonitrile with N-methylolacrylamide, as well as the multi-component polymer of those monomers combined with one or more monoethylenically unsaturated compounds as obtainable in the described manner, is not satisfactory enough for practical purposes so far as its stability behavior is concerned. For example, when such a cross-linking copolymer slurry resulting from the above mentioned copolymerization is dehydrated by filtration and dried so as to obtain a spinning dope, it undergoes a cross-linking to the extent that it is no longer soluble in such solvents as dimethylformamide, dimethylsulfoxide, and concentrated aqueous solution of sodium rhodanate (thiocyanate). Thus, so long as it is not cross-linked yet, such an acrylic copolymer capable of cross-linking remains stable when it is stored under moist conditions. However, the copolymer readily undergoes a cross-linking reaction as soon as it is dehydrated and dried.

We have found that in order to prevent the acrylic copolymer from being cross-linked, it is necessary to convert the sulfonic group $SO_3$ of the copolymer derived from the reducing sulfoxy compound from the H form to the $SO_3M$ form (M represents a member of the class consisting of alkali and alkaline earth metals, e.g. Na, K, Ca, and Ba).

Thus, the invention is concerned also with a method of stabilizing an acrylic copolymer capable of cross-linking as obtainable upon copolymerization in the presence of a redox catalyst system containing a water-soluble reducing sulfoxy compound as one of its components, which comprises adjusting the copolymer slurry obtained as above with an inorganic alkaline metal compound to the pH value ranging from pH 4.5 to pH 6.0 so as to convert the terminal sulfonic group of the copolymer from the H form to the salt form and, accordingly, inhibit the possible cross-linking on dehydration and drying.

The reason why the copolymer slurry must be adjusted to the pH range of 4.5 to 6 is that if the pH is lower than the range mentioned just above, the cross-linking reaction will not be sufficiently inhibited and that if the above pH range is exceeded, the whiteness of the copolymer will be adversely affected.

When the acrylonitrile copolymer slurry capable of cross-linking is treated with an alkali metal compound, the terminal sulfonic group of the copolymer is converted from the H form to the salt form and the small amounts of free acid contained in the copolymer is also neutralized. The cross-linking acrylonitrile copolymer treated as above does not undergo a cross-linking reaction at the subsequent drying step so that it can be completely dissolved in such solvents as dimethylformamide, dimethylsulfoxide, and concentrated aqueous solution of sodium rhodanate, yielding a transparent spinning solution free from insolubles.

The present invention is applicable to the copolymerization in an aqueous medium of acrylonitrile with N-methylolacrylamide as well as the multi-component polymerization of these comonomers and one or more of monoethylenically unsaturated compounds copolymerizable therewith, and the monoethylenically unsaturated compounds referred to just above include, for example, acrylic esters, e.g. methyl acrylate, ethyl acrylate, methyl methacrylate, ethyl methacrylate, etc. vinyl carboxylates such as vinyl formate, vinyl acetate, etc. allylsulfonic acids such as sodium allylsulfonate, sodium methallylsulfonate, and the like. However, the copolymer should contain a predominating amount of acrylonitrile and a minor amount of N-methylolacrylamide. Thus, the content of acrylonitrile in the copolymer should be more than 60% by weight based on the copolymer and that of N-methylolacrylamide should be less than 40% by weight.

As described before, one important feature of the invention is to incorporate a water soluble inorganic salt into the aqueous polymerization medium in an amount of ⅓ or more moles per mole of N-methylolacrylamide. There is no critical upper limit in the amount of the inorganic salt and therefore, extremely speaking, it may be used up to saturation.

Except the above, the polymerization may be conducted in a conventional manner well known in the art of polymerization or copolymerization of acrylonitrile. Thus the reaction may be conducted at a temperature of 30–60° C. preferably at about 45° C.

The second important feature of this invention is in the adjustment with an alkaline inorganic metal compound to pH 4.5–6.0 of an aqueous copolymer slurry resulting from the copolymerization reaction. For this purpose, it is preferable to employ, as the alkaline inorganic metal compound, one or more of hydroxides of ammonium, alkali metals (Na, K, etc.) and alkaline earth metals (Mg, Ca, Sr, etc.).

The present invention will now be described in more detail by way of the following examples, in which all percents and parts are by weight.

EXAMPLE 1

A polymerization vessel is charged with 6.04 parts of acrylonitrile, 0.67 part of N-methylolacrylamide, and 93.08 parts of pure water, and the mixture is adjusted to pH 2.2 with nitric acid. The polymerization reaction is carried out at the temperature of 45° C. for 2 hours. As a redox polymerization catalyst, sodium chlorate and sodium sulfite are used in the molar ratio of 1 to 3, with the total amount of sodium chlorate accounting for 0.5% of the total amount of the monomers. Under those conditions, a cross-linking reaction takes place in the course of polymerization and the resulting copolymer is insoluble in concentrated aqueous solutions of sodium rhodanate.

On the other hand, each of the water-soluble inorganic salts listed in Table 1 is added in such amounts that the total amount of inorganic salts in the polymerization system is one third of a mole for each mole of N-methylolacrylamide present in the system. In these instances, satisfactory non-gelling copolymer slurries are obtained. Thus, the resulting copolymers are soluble in concentrated aqueous solutions of sodium rhodanate.

TABLE 1

|  | Molecular weight of polymer | N-methylolacrylamide in polymer, percent | Solubility in conc. aqueous solution of sodium rhodanate |
|---|---|---|---|
| Inorganic salt added: |  |  |  |
| Control | (¹) | 9.9 | Insoluble. |
| NaCl | 72,600 | 10.4 | Soluble. |
| KCl | 68,800 | 10.3 | Do. |
| LiCl | 69,800 | 10.1 | Do. |
| NaNO₃ | 79,300 | 10.0 | Do. |
| KNO₃ | 65,000 | 9.6 | Do. |
| K₂SO₄ | 72,500 | 11.0 | Do. |
| Na₂SO₄ | 70,300 | 10.8 | Do. |

¹ Not measurable.

The molecular weight of each copolymer was determined by means of Staudinger's equation from its solution in dimethylformamide. However, the copolymer which had undergone cross-linking in the course of copolymerization was insoluble in dimethylformamide and, accordingly, its molecular weight could not be measured. Since the concentrations of N-methylolacrylamide in those copolymers are more or less identical, it is presumed that cross-linking is responsible for the copolymer being insoluble in these solvents.

The concentrations of N-methylolacrylamide in the copolymers were determined by taking advantage of the relative infrared absorbancies of NH and CN groups.

EXAMPLE 2

A polymerization vessel is continuously charged with 23.49 parts of acrylonitrile, 2.49 parts of methyl acrylate, 0.196 part of sodium methallylsulfonate, 1.82 parts of N-methylolacrylamide, and 71 parts of pure water, and the contents are adjusted to pH 2.8 with nitric acid. In this manner, the copolymerization reaction is carried out at the temperature of 45° C. The redox catalyst system consists of sodium chlorate and sodium sulfite, which are used in varying molar ratios.

As to the amount of the catalyst system, it is so arranged that 0.275% of sodium chlorate is added based on the total amount of the monomers. Thus, when 3 moles of sodium sulfite is used for each mole of sodium chlorate, the total inorganic salt is present in the amount of 0.159 mole per mole of N-methylolacrylamide and the copolymer is cross-linked in the course of copolymerization and, therefore, is insoluble in concentrated aqueous solutions of sodium rhodanate. In contrast, when the molar ratio of sodium chlorate to sodium sulfite is 1 to 7.3 or more and the total inorganic salt is present in the amount of 0.33 mole per mole of N-methylolacrylamide, the resulting copolymer is invariably insoluble in concentrated aqueous solutions of sodium rhodanate.

The occurrence of a cross-linking may be ascertained by the solubility of the copolymer in a solvent, and the copolymers insoluble in concentrated aqueous solutions of sodium rhodanate are also insoluble in dimethylformamide and, accordingly, their molecular weights cannot be measured.

TABLE 2

| Catalyst system sodium chlorate/ sodium sulfite (molar ratio) | Total inorganic salt (sodium chlorate plus sodium sulfite) N-methylolacrylamide (molar ratio) | Molecular weight of copolymer | Conc. of N-methylolacrylamide in copolymer, percent | Solubility of copolymer in conc. aqueous solution of sodium rhodanate |
|---|---|---|---|---|
| 1/3 | 0.159 | (¹) | 9.9 | Insoluble. |
| 1/7.3 | 0.330 | 75,000 | 10.5 | Soluble. |
| 1/8 | 0.358 | 76,300 | 9.6 | Do. |
| 1/20 | 0.834 | 77,000 | 11.4 | Do. |

¹ Not measurable.

The amounts of N-methylolacrylamide in the copolymers are determined from the relative infrared absorbancies of NH and CN groups. In these measurements, however, it is impossible to obtain separate results from the cross-linked N-methylolacrylamide and non-cross-linked N-methylolacrylamide, but merely the total amount of N-methylolacrylamide is measured. It will be found that the initial composition of the charge is faithfully reflected in the final coplymer.

EXAMPLE 3

A polymerization vessel was continuously charged with 28.01 parts of a monomeric mixture consisting of 90.4% acrylonitrile and 9.6% methyl acrylate, 1.33 parts of N-methylolacrylamide, 0.21 part, of methallylsulfonate, and 69.3 parts of pure water, and the contents were adjusted to pH 2.7 with nitric acid. In this manner, the copolymerization reaction was carried out at the temperature of 45° C. As the polymerization catalyst, a redox catalyst system composed of sodium chlorate and sodium sulfite (molar ration ⅛) was employed, the amount of the soduim chlorate accounting for 0.275% relative to the total monomer.

The same coplymer as above which, however, had not been treated with sodium hydroxide readily underwent a cross-linking reaction upon drying and, accordingly, became insoluble in concentrated aqueous solution of sodium rhodanate. In contrast, the copolymer treated with sodium hydroxide was completely dissolved in concentrated aqueous solution of sodium rhodanate to yield a transparent solution. The acidities of the copolymers were pH 5.2 for the untreated and pH 6.7 for the copolymer treated with sodium hydroxide.

EXAMPLE 4

A polymerization vessel was continuously charged with 25.0 parts of acrylonitrile, 1.3 parts of N-methylolacrylamide and 72.0 parts of pure water, and the contents were adjusted to pH 2.7 with nitric acid. In this manner, the copolymerization reaction was carried out at the temperature of 45° C. As the polymerization catalyst, a redox initiator consisting of sodium chlorate and sodium sulfite was employed. The molar ratio was one mole of sodium chlorate to 3 moles of sodium sulfite, with the amount of the sodium chlorate being 0.275% relative to the total amount of the monomers. The water-soluble inorganic salt used in this example was sodium chloride which was added in such amounts that the total inorganic salt in the polymerization system was one third or more of a mole per mole of the N-methylolacrylamide.

The resulting copolymer slurry was adjusted to pH 6 with 2% aqueous solution of potassium hydroxide. Whereas the copolymer untreated readily underwent a cross-linking reaction upon drying and, accordingly, became insoluble in dimethylformamide, the same copolymer as above which, however, had been preliminarily treated as above could be completely dissolved in dimethylformamide, yielding a transparent solution.

What we claim is:

1. In a method of producing a cross-linkable acrylonitrile coplymer comprising copolymerizing at least 60% by weight acrylonitrile with N-methylolacrylamide alone or together with at least one or more monoethylenically unsaturated compounds in an aqueous medium and in the presence of a redox catalyst system containing a reducing sulfoxy compound as one of its components, the improvement according to which the copolymerization reaction is conducted at a pH of 4 or lower and at a temperature of 30–60° C. in the presence of one or more water-soluble inorganic salts selected from the group consisting of water-soluble metal chlorides, water-soluble metal sulfates, water-soluble metal nitrates or a reducing component selected from the group consisting of sulfites, bisulfites, metasulfites, hydrosulfites, and thiosulfites said reducing component being in excess of the amount to be consumed in the reduction-oxidation of the redox catalyst system containing the reducing sulfoxy compound, said inorganic salt being present in an amount of ⅓ or more moles per mole of the N-methylolacrylamide.

2. A method as claimed in claim 1 wherein the copolymer slurry resulting from the copolymerization is adjusted to a pH of 4.5–6.0 with one or more of ammonium, alkali metal and alkaline earth metal hydroxides.

References Cited

UNITED STATES PATENTS

| | | |
|---|---|---|
| 2,718,515 | 9/1955 | Thomas. |
| 2,761,856 | 9/1956 | Suen et al. _____ 260—87.5 |
| 2,984,588 | 5/1961 | Graulich et al. |

HARRY WONG, Jr., Primary Examiner

U.S. Cl. X.R.

260—29.6, 30.8, 32.6, 79.3, 85.5